(12) United States Patent
Malliah et al.

(10) Patent No.: US 11,216,808 B2
(45) Date of Patent: Jan. 4, 2022

(54) TOKEN-BASED SYSTEM FOR EXCISING DATA FROM DATABASES

(71) Applicant: The Toronto-Dominion Bank, Toronto (CA)

(72) Inventors: Avinash Malliah, Toronto (CA); Roisin F. Fritz, Toronto (CA); Jonathan K. Barnett, Oakville (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1272 days.

(21) Appl. No.: 15/286,422

(22) Filed: Oct. 5, 2016

(65) Prior Publication Data

US 2017/0124557 A1    May 4, 2017

Related U.S. Application Data

(60) Provisional application No. 62/250,817, filed on Nov. 4, 2015.

(51) Int. Cl.
| | | |
|---|---|---|
| *G06Q 20/38* | (2012.01) | |
| *G06Q 20/10* | (2012.01) | |
| *H04L 9/14* | (2006.01) | |
| *H04L 9/30* | (2006.01) | |
| *H04L 9/32* | (2006.01) | |

(52) U.S. Cl.
CPC ......... *G06Q 20/3829* (2013.01); *G06Q 20/10* (2013.01); *G06Q 20/3823* (2013.01); *G06Q 20/38215* (2013.01); *H04L 9/14* (2013.01); *H04L 9/30* (2013.01); *H04L 9/3247* (2013.01)

(58) Field of Classification Search
CPC .................................................. G06Q 20/3829
USPC ........................................................... 705/65
See application file for complete search history.

(56) References Cited

U.S. PATENT DOCUMENTS

| | | |
|---|---|---|
| 6,128,735 A | 10/2000 | Goldstein |
| 8,036,941 B2 | 10/2011 | Bennett et al. |
| 8,108,303 B2 | 1/2012 | Moran |
| 8,140,442 B2 | 3/2012 | Heyer |
| 8,363,827 B2 | 1/2013 | Yap |
| 8,688,594 B2 | 4/2014 | Thomas et al. |
| 8,914,632 B1 | 12/2014 | Shankar |
| 2003/0056108 A1* | 3/2003 | Mont ................... G06F 21/6245 713/193 |

(Continued)

OTHER PUBLICATIONS

White, How Computers Work 7th Ed, p. 4, (Year: 2003).*

*Primary Examiner* — Mohammad A. Nilforoush
*Assistant Examiner* — Cristina Owen Sherr
(74) *Attorney, Agent, or Firm* — Graham Patent Law

(57) ABSTRACT

A message processing server includes a message processor, a network interface, and a memory storing a token database of multi-layer tokens. Each token in the database includes a plurality of encrypted data layers. The message processor receives, via the network interface, at least one authorization message that identifies one of the tokens, derives a first decrypted data layer from the first encrypted data layer of the token, and extracts from the first decrypted data layer a second pointer to a secondary database that stores a predetermined data value. The message processor excises the predetermined data value from the secondary database.

9 Claims, 6 Drawing Sheets

(56) References Cited

U.S. PATENT DOCUMENTS

| | | |
|---|---|---|
| 2005/0204128 A1 | 9/2005 | Aday |
| 2006/0123465 A1 | 6/2006 | Ziegler |
| 2006/0282901 A1 | 12/2006 | Li |
| 2007/0058548 A1* | 3/2007 | Babonneau .......... H04L 47/2441 370/235.1 |
| 2007/0169175 A1* | 7/2007 | Hall ...................... H04L 67/142 726/3 |
| 2008/0183593 A1* | 7/2008 | Dierks ............... G06Q 30/0601 705/26.35 |
| 2008/0244721 A1 | 10/2008 | Barms |
| 2009/0198991 A1* | 8/2009 | Owens .................. G06F 21/575 713/2 |
| 2010/0042534 A1 | 2/2010 | Moran |
| 2010/0106649 A1 | 4/2010 | Annan |
| 2014/0344153 A1 | 11/2014 | Raj |
| 2015/0032626 A1* | 1/2015 | Dill ...................... G06Q 20/385 705/44 |
| 2015/0081567 A1* | 3/2015 | Boyle .................... G06Q 20/02 705/71 |
| 2015/0127524 A1 | 5/2015 | Jacob |
| 2015/0249651 A1 | 9/2015 | Okamoto |
| 2015/0262246 A1 | 9/2015 | Stack |
| 2015/0288663 A1 | 10/2015 | Watanabe |
| 2015/0379295 A1 | 12/2015 | Branton |
| 2016/0085955 A1* | 3/2016 | Lerner .................... G06F 21/31 726/20 |
| 2016/0119296 A1 | 4/2016 | Laxminarayanan |
| 2016/0247151 A1 | 8/2016 | Gupta |
| 2016/0294562 A1 | 10/2016 | Oberheide |
| 2017/0283415 A1 | 10/2017 | Kurito |

\* cited by examiner

TOKEN-BASED SYSTEM FOR EXCISING DATA FROM DATABASES

RELATED APPLICATIONS

This patent application claims the benefit of the filing date of U.S. Patent Application Ser. No. 62/250,817, filed Nov. 4, 2015, the contents of which are incorporated herein by reference.

FIELD OF THE INVENTION

This patent application relates to a method and network for accessing and excising data from databases.

BACKGROUND

Before agreeing to the terms of a business transaction proposed by a new customer, a service provider might require the customer to provide the service provider with a Letter of Guarantee (LOG) or a Letter of Credit (LOC), issued by the customer's financial institution, demonstrating that the customer has sufficient funds in escrow to guarantee payment for the business transaction.

The LOG/LOC is typically addressed to the service provider by the customer's financial institution, and specifies the terms upon which the financial institution will release the escrow funds. Therefore, the service provider must file a demand for payment with the financial institution in the event of default by the customer.

SUMMARY

This patent application discloses a message processing server and associated method that uses multi-layer tokens to excise data from databases.

In accordance with a first aspect of the disclosure, there is provided a message processing server that includes a message processor and a token database of multi-layer tokens. Each token in the database includes a plurality of encrypted data layers.

The message processor is configured to (i) receive at least one authorization message that identifies one of the multi-layer tokens, (ii) derive a first decrypted data layer from a first of the encrypted data layers of the one multi-layer token, and (iii) extract from the first decrypted data layer a second pointer to a secondary database that stores a predetermined data value, and (iv) excise the predetermined data value from the secondary database.

In accordance with a second aspect of the disclosure, there is provided a method of excising data using a token database of multi-layer tokens. Each token in the database includes a plurality of encrypted data layers.

The method involves a message processor receiving at least one authorization message identifying one of the multi-layer tokens, the message processor deriving a first decrypted data layer from a first of the encrypted data layers of the one multi-layer token, and extracting from the first decrypted data layer a second pointer to a secondary database. The secondary database stores a predetermined data value. The method also involves the message processor excising the predetermined data value from the secondary database.

In one implementation, the multi-layer token includes a primary encrypted data layer that includes the first encrypted data layer and identifies the predetermined data value. Prior to receiving the at least one authorization message, the message processor receives from a communications device a validation request for validation of the one multi-layer token. The validation request includes a master cryptographic key. The message processor derives a primary decrypted data layer from the one multi-layer token, by decrypting the primary encrypted data layer with the master cryptographic key.

In this implementation, the message processor also extracts the predetermined data value from the primary decrypted data layer, provides the communications device with the extracted predetermined data value, receives a validation confirmation message from the communications device in response to the extracted predetermined data value, and saves the primary decrypted data layer in the token database.

As will become apparent, although a customer can use the multi-layer token to demonstrate that the customer has sufficient funds in escrow to complete a transaction, the multi-layer token and associated method and message processing server also allows a person to confidentially release confidential information to another party and to subsequent control the destruction of that information.

BRIEF DESCRIPTION OF THE DRAWINGS

An exemplary message processing network, message processing server, and method of excising data will now be described, with reference to the accompanying drawings, in which.

DETAILED DESCRIPTION

Message Processing Network—Overview

Figure 1:
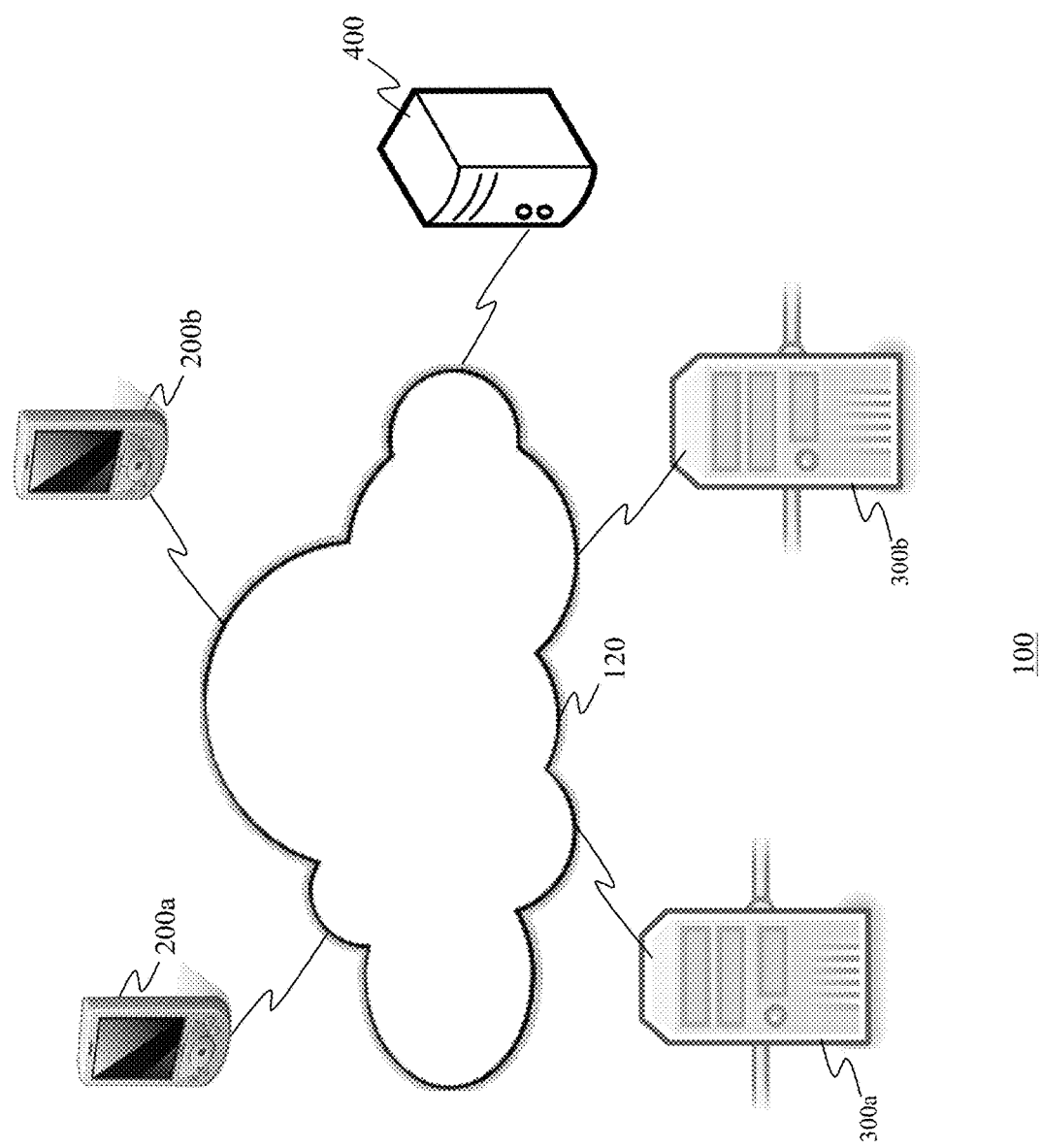
FIG. 1 is a schematic view of the message processing network, depicting a message processing server and a plurality of communications devices.

FIG. 1 is a schematic view of a message processing network, denoted generally as 100. As shown, the message processing network 100 comprises a first communications device 200a, a second communications device 200b (collectively, communications devices 200), a customer's financial institution server 300a, a payee financial institution server 300b (collectively, financial institution servers 300), and a message processing server 400.

Although the message processing network 100 is shown comprising only two communications devices 200 and only two financial institution servers 300, the message processing network 100 typically comprises a plurality of the communications devices 200 and a plurality of the financial institution servers 300. Moreover, although the message processing network 100 is shown comprising only a single message processing server 400, the message processing network 100 may include a plurality of the message processing servers 400.

The communications devices 200 communicate with the message processing server 400 via a wide area network 120, such as the Internet. One or more of the communications devices 200 may be implemented as a wireless communications device configured to operate within a wireless network. As non-limiting examples, one or more of the wireless communications device 200 could be implemented as a wireless-enabled tablet computer, a wireless-enabled PDA, or a smart phone. Accordingly, the wide area network 120 may include a mobile communications network that is configured as a WiFi network, a cellular network, or a combination thereof.

Each financial institution server 300 is associated with and is administered by a respective financial institution, and is configured to communicate with the message processing server 400 and the other financial institution server(s) 300 via the wide area network 120. Each financial institution server 300 may maintain a secure accounts database that includes groups of related database records. In one example, each records group is uniquely associated with a respective financial account of one of its customers, and identifies an account number of the associated financial account, and the credit/deposit entries to the associated financial account.

Each financial institution server 300 may also maintain a database of registered users of the associated financial institution. In one example, the database saves, for each registered user, authentication credentials (e.g. user identifier, user authentication code (e.g. password, passcode)) that allow the associated user to authenticate to the financial institution server 300.

The message processing server 400 may be implemented as a computer server, and is configured to receive at least one authorization message identifying a multi-layer token 250 (see FIG. 3), derive a first decrypted data layer from a first of the encrypted data layers 254 of the multi-layer token 250, and extract from the first decrypted data layer a second pointer to a secondary database. A database record of the secondary database may store a predetermined data value. The message processor 418 is also configured to excise the predetermined data value from the secondary database. Therefore, a person may use the multi-layer token 250 and the message processing server 400 to confidentially release confidential information to another party and to subsequent control the destruction of that information.

Alternately, a person may use the multi-layer token 250 and the message processing server 400 to confirm the sufficiency of escrow funds for a transaction and to effect the release of the escrow funds upon satisfaction of one or more escrow release conditions. Therefore, in one example, the message processing server 400 may receive a transaction performance report (authorization message) that indicates whether a transaction or performance milestone has been completed, and may be configured to use the multi-layer token 250 to initiate a release of funds in an escrow amount (the predetermined data value) from a secondary escrow account (the secondary database) to, for example, (i) a primary escrow account that is associated with a customer of the message processing network 100 or (ii) a financial account that is associated with a service provider hired/retained by the customer (a primary database). The message processing server 400 may initiate the release of escrow funds upon satisfaction of one or more escrow release conditions.

The escrow accounts may be maintained by the customer's financial institution server 300a, and the service provider's financial account ("payee account") may be maintained by the payee financial institution server 300b. Alternately, the escrow accounts and the payee account may be maintained by a common financial institution server 300. Independently of the number of financial institution servers 300 used to maintain the escrow accounts and the payee account, the message processing server 400 acts as a trusted intermediary to the financial institution server(s) 300.

Communications Device

Figure 2:
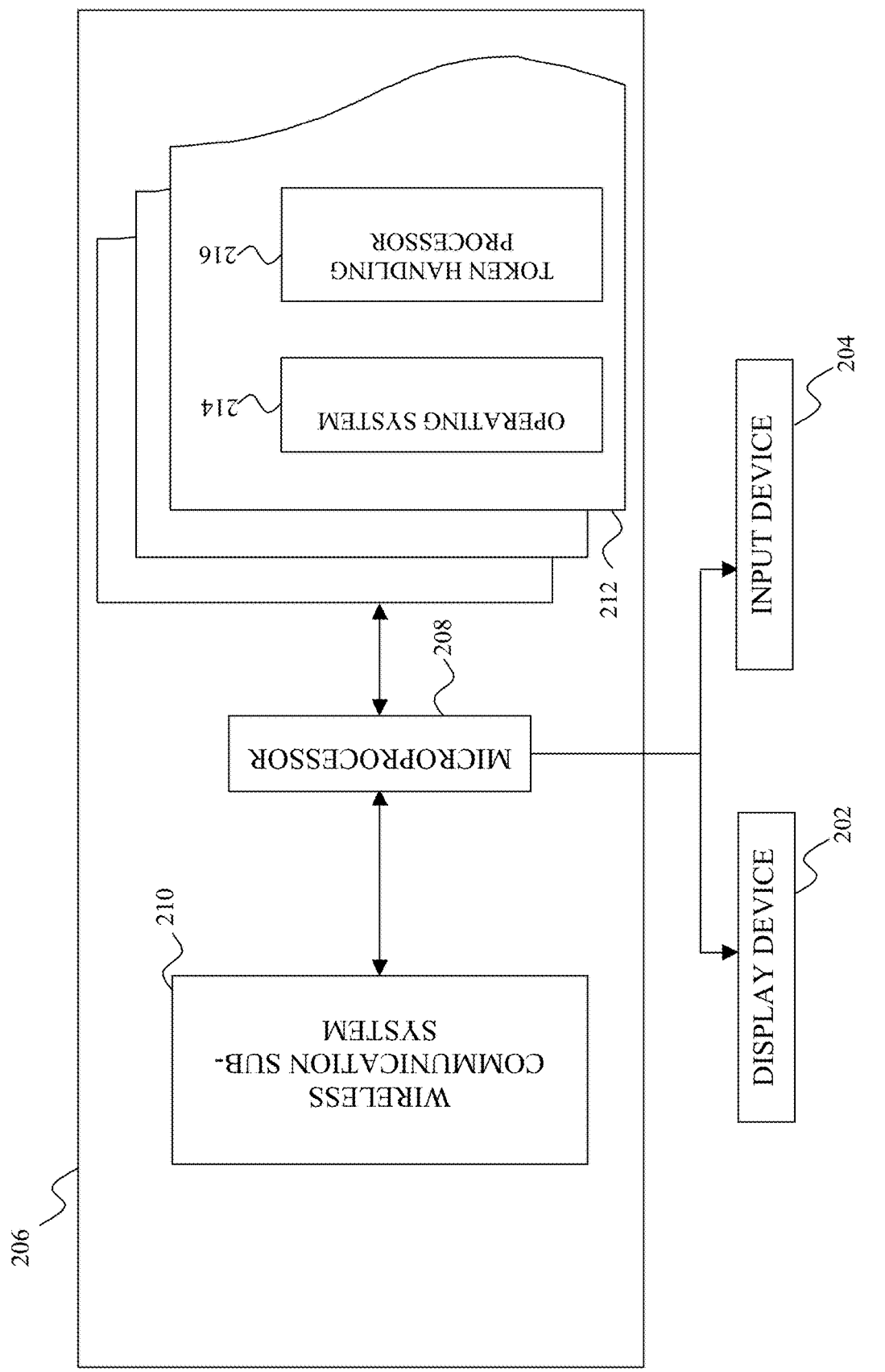
FIG. 2 is a schematic view of one of the communications devices.

A sample communications device 200 is depicted in FIG. 2. As shown, the mobile communications device 200 includes a display 202, user input device 204, and a data processing system 206. The user input device 204 may be provided as a keyboard, biometric input device (e.g. microphone) and/or a touch-sensitive layer provided on the display 202. The data processing system 206 comprises a microprocessor 208, a wireless communication sub-system 210 and a tangible non-transient computer-readable medium 212.

The communication sub-system 210 allows the mobile device 200 to communicate with the wireless network of the wide area network 120. As discussed, the wireless network may be configured as a WiFi network, a cellular network, or a combination thereof. Accordingly, the communication sub-system 210 allows the mobile device 200 to transmit and receive wireless communications signals over WiFi networks and/or cellular networks.

The computer-readable medium 212 may store a private cryptographic key of an asymmetric cryptographic key pair that is associated with the user of the communications device 200. Further, the computer-readable medium 212 typically comprises non-volatile electronic computer memory that stores computer processing instructions which, when accessed from the memory 212 and executed by the microprocessor 208, implement an operating system 214 and a token handling processor 216. The operating system 214 is configured to display output on the display 202, to receive user input from the input device 204, and to send and receive communication signals over the wireless network.

The operation of the token handling processor 216 will be discussed in greater detail below. However, it is sufficient at this point to note that the token handling processor 216 is configured to receive a pointer to a multi-layer multi-layer token 250 for a prospective business transaction, and to transmit the pointer to the message processing server 400 to effect a release of escrow funds from a secondary escrow account.

Multi-Layer Token

As discussed, a person may use the multi-layer token 250 (and the message processing server 400) to confidentially release confidential information to another party and to subsequent control the destruction of that information. Alternately, a person may use the multi-layer token 250 (and the message processing server 400) to confirm the sufficiency of escrow funds for a transaction and to effect the release of the escrow funds from a secondary escrow account to either (i) a primary escrow account that is associated with a customer of the message processing network 100 or (ii) a financial account that is associated with a service provider hired/retained by the customer. The message processing server 400 may initiate the release of escrow funds upon satisfaction of one or more escrow release conditions.

Figure 3:
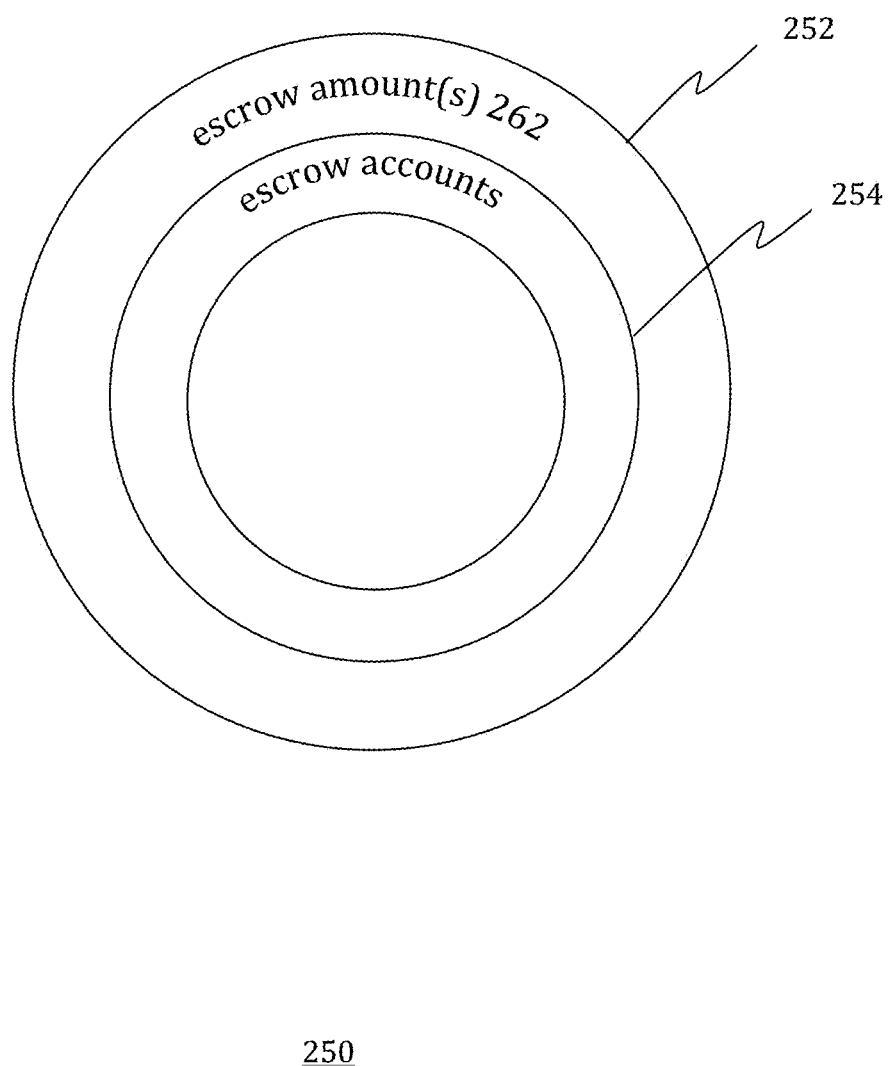
FIG. 3 is a logical representation of one of the multi-layer tokens.

As shown in FIG. 3, each multi-layer token 250 includes a plurality of data segments, configured in a hierarchical arrangement, such that each "parent" data segment includes at least one "child" data segment. In the embodiment shown, the multi-layer token 250 comprises a hierarchical arrangement of encrypted data segments (encrypted data "layers"), for example a primary encrypted data segment 252, and one or more first encrypted data segments 254.

In this implementation, each first encrypted data segment (the "inner" data layer) 254 includes a pointer to a secondary database. The secondary database may store a respective predetermined data value. Each first encrypted data layer 254 may also include a pointer to a primary database, and may also store at least one rule that specifies when the multi-layer token 250 should be expired/deleted from the token database 412 (described below with reference to the message processing server 400).

In the implementation depicted in FIG. 3, the primary encrypted data segment (the "outer" data layer) 252 includes the first encrypted data segment(s)/layer(s) 254 and identifies a predetermined data value.

As an example, a customer of a service provider may have retained the service provider to provide a service (e.g. complete a business transaction) and may be contractually obligated to provide the service provider with a payment (transaction payment amount) upon the service provider completing the business transaction or a performance milestone thereof. Therefore, the primary database may comprise a "primary" escrow account that holds funds in escrow for use by the registered user ("customer") of the multi-layer token 250.

Each secondary database may comprise a "secondary" escrow account that is associated with a respective prospective business transaction (or a performance milestone thereof), and may hold funds in an amount of the respective predetermined data value (e.g. an "escrow amount") to guarantee payment of the transaction payment amount for the associated business transaction (or performance milestone). A database record of the secondary database may identify the current balance ("escrow amount") of funds in the respective secondary escrow account. The at least one rule may comprise escrow release conditions that define the conditions under which the escrow amount(s) can be withdrawn/released from a secondary escrow account.

In the implementation depicted in FIG. 3, therefore, the pointers of the first encrypted data segment 254 may identify a customer's financial institution, a primary escrow account, an escrow amount, and the secondary escrow account that is maintained by the customer's financial institution server 300a and has an available balance equal to the escrow amount. The escrow release conditions may specify when the escrow amount can be released from the secondary escrow account.

The primary encrypted data layer 252 includes the first encrypted data segment(s)/layer(s) 254 and may identify the predetermined data value (e.g. escrow amount) 262 for the business transaction. Where the business transaction comprises a plurality of performance milestones, the primary encrypted data segment/layer 252 may identify a predetermined data value (e.g. escrow amount) 262 for each performance milestone.

Message Processing Server

Figure 4:
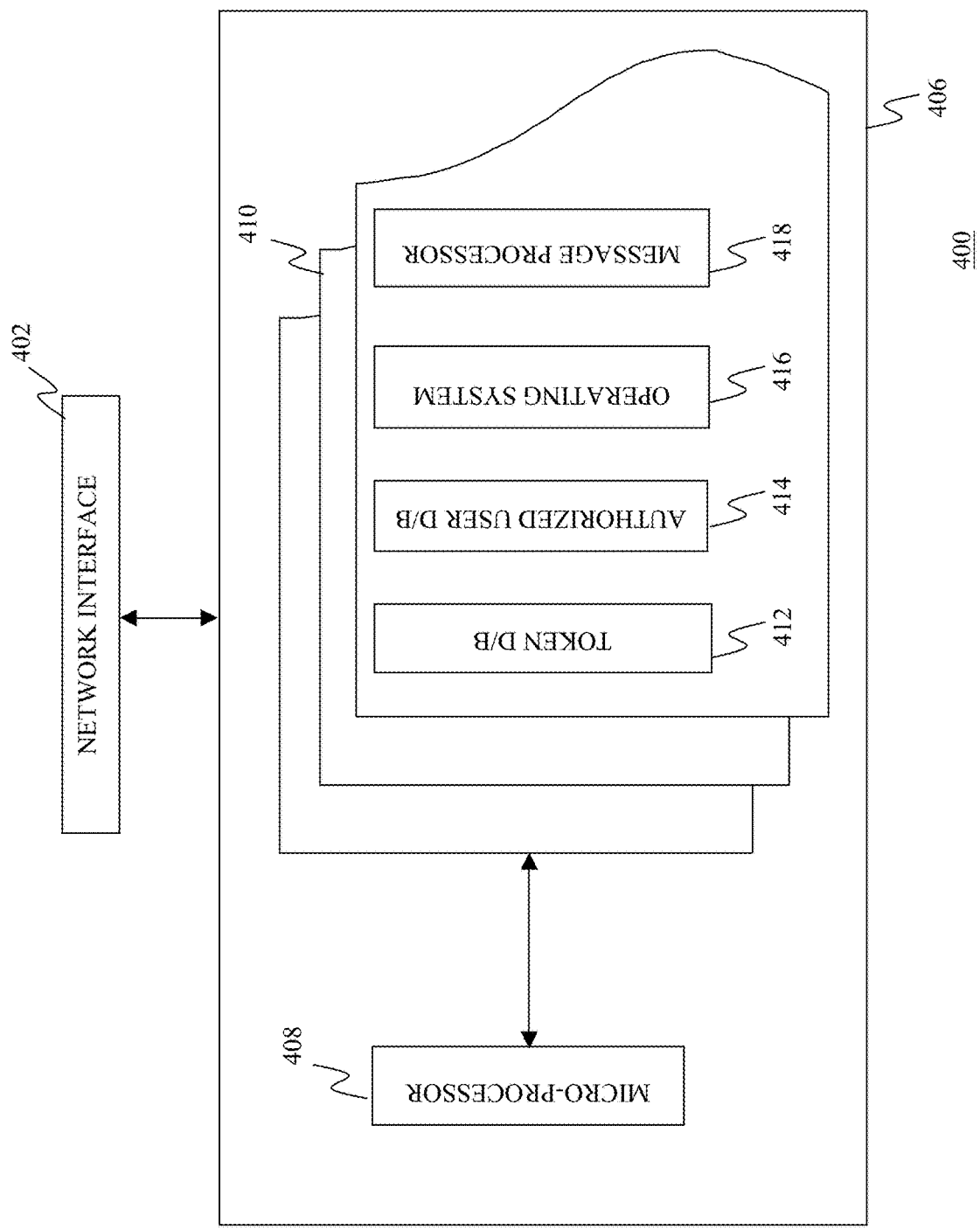
FIG. 4 is a schematic view of the message processing server.

As shown in FIG. 4, the message processing server 400 includes a network interface 402, and a data processing system 406 that is coupled to the network interface 402. The network interface 402 interfaces the message processing server 400 with the financial institution server(s) 300 via the wide area network 120.

The data processing system 406 may include one or more microprocessors 408 and a tangible non-volatile computer-readable medium 410. The computer-readable medium 410 may be provided as electronic computer memory (e.g. flash memory) or optical or magnetic memory (e.g. compact disc, hard disk).

The computer-readable medium 410 may maintain a token database 412 and an authorized user database 414. The token database 412 includes groups of related database records. Each records group is uniquely associated with a respective multi-layer token 250, and typically stores a multi-layer token 250 and one or more associated cryptographic keys.

As discussed above, each multi-layer token 250 may include at least a primary encrypted data segment 252, and one or more first encrypted data segments 254. Each data segment 252, 254 may be encrypted using a respective cryptographic key that is uniquely associated with the respective data segment. Accordingly, each records group of the token database 412 may include at least a master token cryptographic key K0 uniquely associated with the primary encrypted data segment 252, and a first token cryptographic key K1 uniquely associated with the first encrypted data segment 254. If the multi-layer token includes a plurality of first encrypted data segments 254, each records group of the token database 412 may include a set of first token cryptographic keys K1$x$, with each first token cryptographic keys K1 of the set of keys K1$x$ being uniquely associated with a respective first encrypted data segment 254.

Each cryptographic key K0, K1 may be a symmetric cryptographic key that is used to generate and decrypt the associated data segment. Therefore, the master token cryptographic key K0 may be used to generate and decrypt the primary encrypted data segment 252, and each first token cryptographic key K1 may be used to generate and decrypt the associated first encrypted data segment 254.

Alternately, one or more of the cryptographic keys K0, K1 may be a private cryptographic key of an asymmetric cryptographic key pair. Each private cryptographic key may be used to generate the associated data segment, and each corresponding public cryptographic key may be used to decrypt the associated data segment. Therefore, the master token private cryptographic key K0 may be used to generate the primary encrypted data segment 252, and each first token private cryptographic key K1 may be used to generate the associated first encrypted data segment 254. A master token public cryptographic key K0' may be used to decrypt the primary encrypted data segment 252, and a first token public cryptographic key K1' may be used to decrypt a first encrypted data segment 254.

The authorized user database 414 may include groups of related database records. In one example, each records group is uniquely associated with a respective registered user of the message processing network 100, and typically identifies the name of the registered user, and a unique user identifier userID for the registered user. One or more records groups may also include a public cryptographic key of an asymmetric cryptographic key pair that is associated with the registered user.

The non-transient computer-readable medium 410 also stores computer processing instructions which, when executed by the microprocessor(s) 408, define an operating system 416 that controls the overall operation of the message processing server 400. The computer processing instructions may also implement a message processor 418.

The message processor 418 is configured to receive at least one authorization message (e.g. a transaction performance report) identifying one of the multi-layer tokens 250, derive a first decrypted data layer from a first of the encrypted data layers 254 of the one multi-layer token 250, and extract from the first decrypted data layer a second pointer to a secondary database (e.g. secondary escrow account). A database record of the secondary database may store a predetermined data value (e.g. escrow amount). The message processor 418 is also configured to excise the predetermined data value from the secondary database.

The message processor 418 may also be configured to add the predetermined data value to the primary database.

The message processor 418 may be configured to, prior to receiving the at least one authorization message, receive from a communications device 200 a validation request for validation of the one multi-layer token 250 (the validation request including a master cryptographic key K0), derive a primary decrypted data layer from the one multi-layer token 250 by decrypting the primary encrypted data layer 252 with the master cryptographic key K0, extract the predetermined data value (e.g. escrow amount) from the primary decrypted data layer, and provide the communications device 200 with the extracted predetermined data value. The message processor 418 may also receive a validation confirmation message from the communications device 200 in response to the extracted predetermined data value, and save the primary decrypted data layer in the token database 412.

The message processor 418 may be configured to locate the first token cryptographic key K1 associated with one multi-layer token 250, in response to the receiving the at least one authorization message, and derive the first decrypted data layer by decrypting the first of the encrypted data layers 252 with the located first token cryptographic key K1.

The message processor 418 may also be configured to excise the predetermined data value (e.g. escrow amount) from the secondary database (e.g. secondary escrow account) by, for example, extracting from the first decrypted data layer a first pointer to a primary database (e.g. primary escrow account), and extracting from the first decrypted data layer at least one rule (e.g. escrow release conditions) defining an expiration of the one multi-layer token 250, correlating the at least one authorization message with the at least one rule, adding to the secondary database (e.g. secondary escrow account) at least one new database record reflecting a withdrawal of funds from the secondary database in an amount of the predetermined data value (e.g. escrow amount), and adding to the primary database (e.g. primary escrow account) at least one new database record reflecting a deposit of funds to the primary database in an amount of the predetermined data value.

Although the message processor 418 is typically implemented as computer processing instructions, all or a portion of the token processor 418 may be implemented instead in electronics hardware, such as a field programmable logic gate array (FPGA) or a complex programmable logic device (CPLD).

Method of Excising Data

As discussed, the message processing network 100 implements a method of excising data using a message processor 418 and a token database 412 of multi-layer tokens 250. A sample embodiment of the method will be discussed below, with reference to FIGS. 5a, 5b.

By way of overview, each multi-layer token 250 includes at least one encrypted data segment/layer. As will be explained, in this embodiment, the message processor 418 receives at least one authorization message (e.g. a transaction performance report) identifying one of the multi-layer tokens 250, derives a first decrypted data layer from a first of the encrypted data layers 252 of the one multi-layer token 250, and extracts from the first decrypted data layer a second pointer to a secondary database (e.g. secondary escrow account). The secondary database stores a predetermined data value (e.g. escrow amount). The message processor also excises the predetermined data value from the secondary database.

The message processor may also add the predetermined data value to the primary database.

Prior to the message processor 418 receiving the at least one authorization message, the message processor 418 may receive from a communications device 200 a request for the one multi-layer token 250 (the multi-layer token request including a master token cryptographic key K0), derive a primary decrypted data layer from the one multi-layer token 250 by decrypting the primary encrypted data layer 252 with the master token cryptographic key K0, and extract the predetermined data value (e.g. escrow amount) from the primary decrypted data layer, and provide the communications device 200 with the extracted predetermined data value. The message processor 418 may also receive a validation confirmation message from the communications device 200 in response to the extracted predetermined data value, and save the primary decrypted data layer in the token database 412.

The message processor 418 may excise the predetermined data value (e.g. escrow amount) from the secondary database (e.g. secondary escrow account) by extracting from the first decrypted data layer a first pointer to a primary database (e.g. primary escrow account) and extracting from the first decrypted data layer at least one rule (e.g. escrow release conditions) defining an expiration of the one multi-layer token, correlating the at least one authorization message with the at least one rule, adding to the secondary database at least one new database record reflecting a withdrawal of funds from the secondary database in an amount of the predetermined data value (e.g. escrow amount), and adding to the primary database at least one new database record reflecting a deposit of funds to the primary database in an amount of the predetermined data value.

Figure 5A:
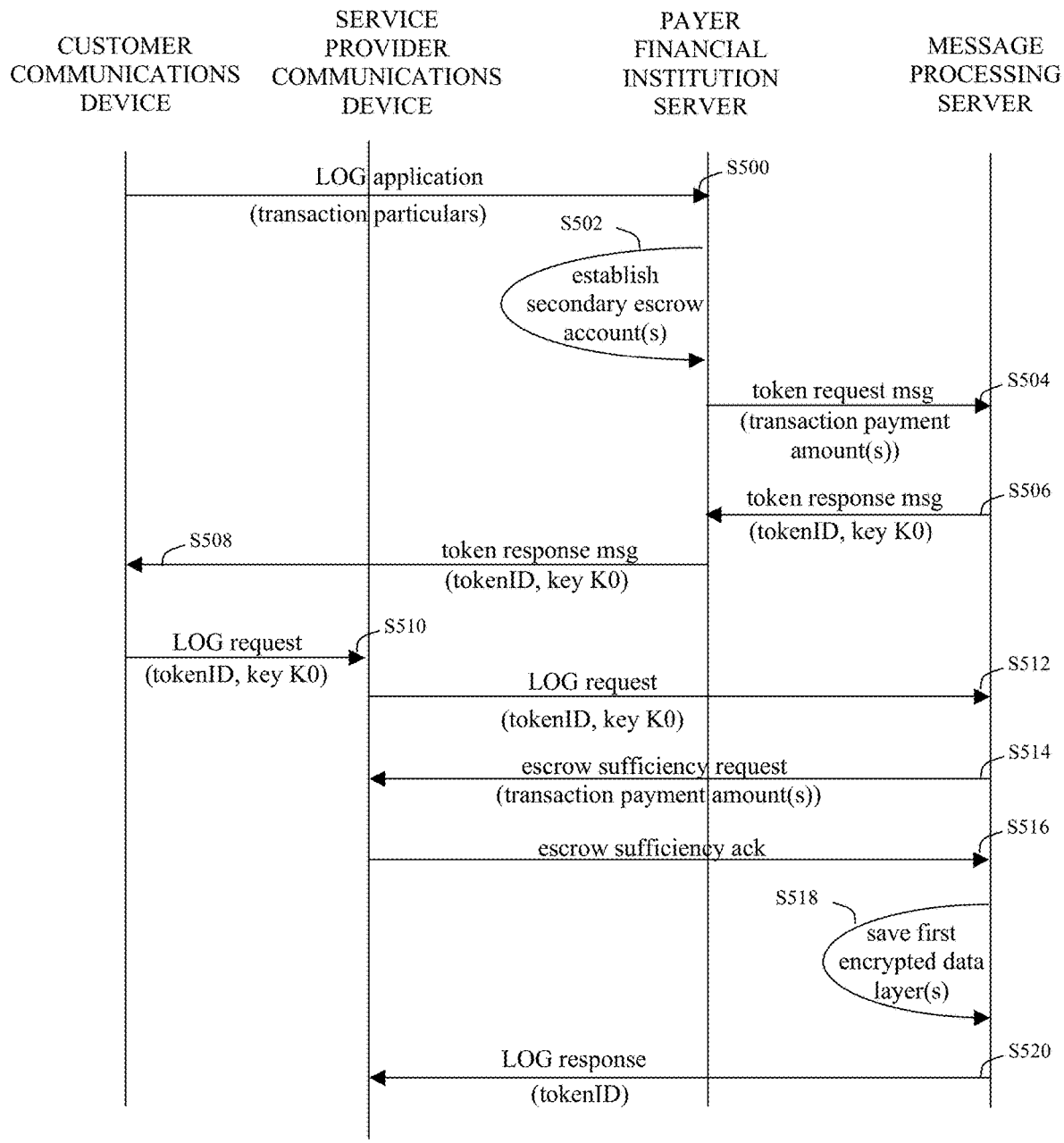
FIGS. 5a, 5b together comprise a message flow diagram depicting the method of excising data using one of the multi-layer tokens.
Figure 5B:
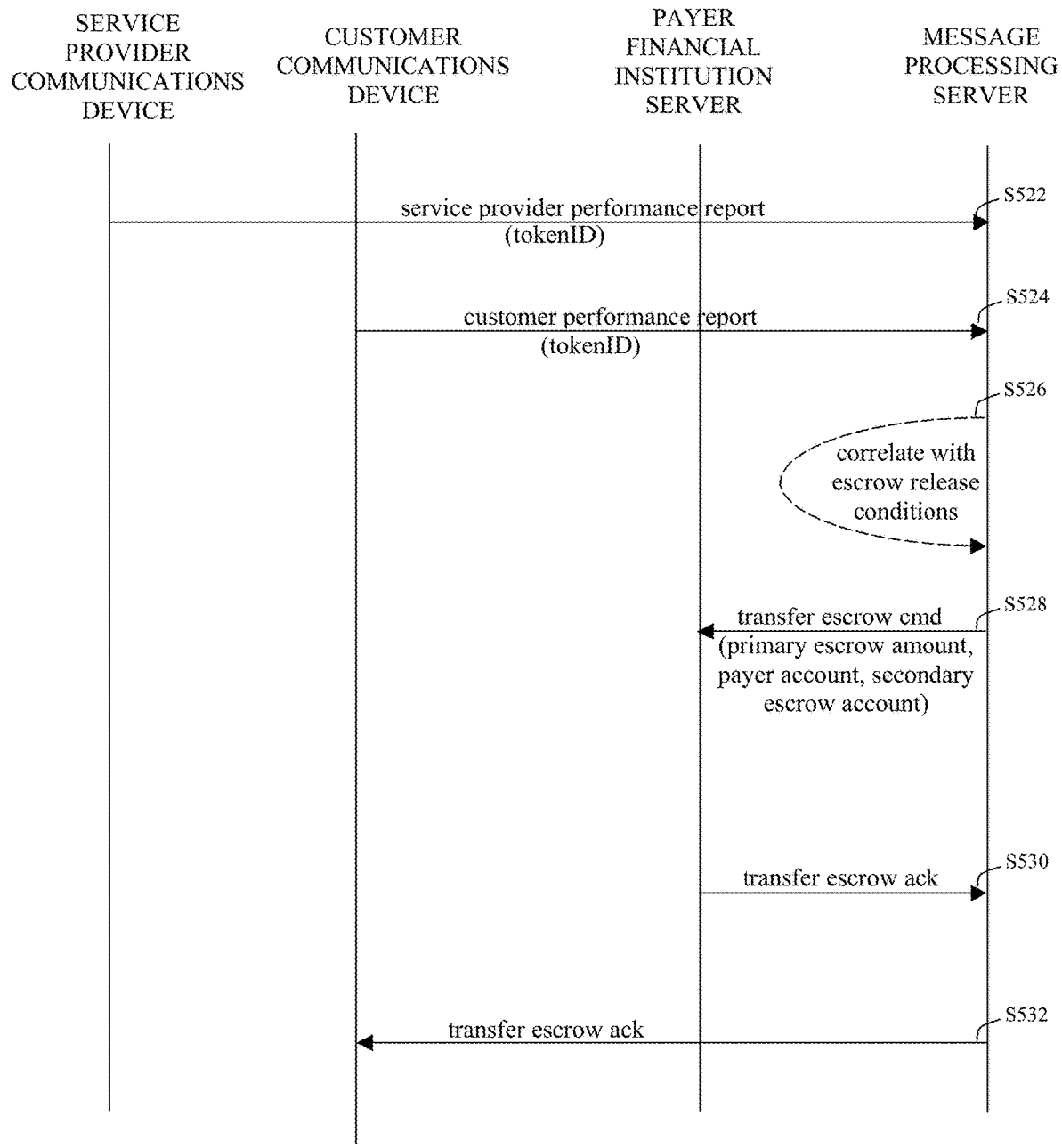

An example method of excising data will now be discussed in detail with reference to FIGS. 5a, 5b. The following method includes two phases: (1) a Token Generation Phase, and (2) a Token Decryption Phase. The token decryption phase itself includes two sub-phases: (a) a First Token Cryptographic Key Download Sub-phase, and (b) a Multi-layer token Destruction Sub-phase. The foregoing phases are discussed below under their respective headings.

(1) Token Generation Phase

At the outset of the method, in order to guarantee payment for prospective business transactions, a registered user ("customer") of the message processing network 100 places funds in escrow in a financial account (the "primary escrow account") that is maintained by the customer's financial institution. Depending on the business needs of the customer, the funds deposited in the primary escrow may be sufficient to guarantee payment for multiple simultaneous prospective business transactions or only a single prospective business transaction.

The customer may then connect to the customer's financial institution server 300a of the customer's financial institution via the customer's communications device 200a, and use the customer's communications device 200 to authenticate to the customer's financial institution by providing the customer's financial institution server 300a with a user identifier and authentication code.

After the customer has authenticated to the customer's financial institution 300, the customer may use the payer communications device 200a to invoke a process running on the customer's financial institution server 300a, initiating an application for a virtual Letter of Guarantee ("LOG") to guarantee payment for a prospective business transaction (e.g. purchase of wares or services) with another registered user ("service provider") of the message processing network 100.

In response to the LOG application, the customer's financial institution server 300a may request, from the customer, transaction particulars (e.g. name of service provider, escrow amount, and/or account number of the primary escrow account) of the prospective business transaction. The transaction particulars may also include a completion date for the business transaction and/or escrow release conditions.

The escrow amount is the monetary amount of funds that are being placed in escrow to guarantee payment for the transaction payment amount. The transaction payment amount is a monetary amount that the customer must pay to the service provider upon completion of the business transaction (or upon completion of a performance milestone of the business transaction). The escrow amount is typically equal to the transaction payment amount, but may be less than the transaction payment amount where, for example, the customer and service provider have previously transacted business without a default in payment by the customer.

The completion date is the date by which the customer requires the service provider to have completed performance of the business transaction (or the performance milestone of the business transaction).

As will be discussed, the primary escrow account is the financial account from which funds (equal to the escrow amount) will be withdrawn to guarantee payment of the transaction payment amount. In order to guarantee payment of each transaction payment amount, the customer financial institution establishes a secondary escrow account for the business transaction (or plurality of secondary escrow accounts, each for a respective performance milestone), and transfers funds ("escrow funds") from the primary escrow account to the secondary escrow account(s) in amounts equal to the respective escrow amounts.

The escrow release conditions include one or more primary release conditions, and may also include one or more secondary release conditions. The primary release conditions indicate or imply that the business transaction (or a performance milestone) has been completed and that the escrow funds therefor can be released. Therefore, primary release conditions are conditions, which when satisfied, cause the escrow funds that are being used to guarantee payment of a transaction payment amount to be released from the secondary escrow account and returned to the primary escrow account.

Primary release conditions include, but are not limited to:

(i) the customer alleging that it has provided the service provider with payment in an amount equal to the transaction payment amount for the business transaction (or for a performance milestone);

(ii) the service provider confirming that it has received payment from the customer in an amount equal to the transaction payment amount for the business transaction (or for a performance milestone);

(iii) the service provider alleging that it has completed performance of the business transaction (or for a performance milestone) by the completion date (e.g. the service provider shipped the goods ordered by the customer, or performed the services requested by the customer); and (iv) the customer confirming that the service provider has completed performance of the business transaction (or for a performance milestone) by the completion date (e.g. the customer received the goods ordered by the customer, or received the services requested by the customer).

The secondary release conditions are conditions, which when satisfied, may cause the escrow funds to be withdrawn from the secondary transaction account, if none of the primary release conditions are satisfied. In contrast to the primary release conditions, the secondary release conditions may cause the escrow funds to be returned to the primary transaction account or to be transferred to a payee account that is associated with the service provider.

Further, in contrast to the primary release conditions, the secondary release conditions are contentious conditions, in which the customer and the service provider do not agree that the escrow funds should be transferred back to the primary escrow account. Therefore, in one example, the secondary release conditions allow the escrow funds to be withdrawn from a secondary escrow account only after the customer's financial institution receives a third-party direction for the funds transfer (for example, upon receipt of a direction from a mediator, administrative body or court of competent jurisdiction).

Secondary release conditions include, but are not limited to:

(i) the customer asserts that the service provider has not completed performance of the business transaction (or for a performance milestone) by the completion date, where the service provider contradicts that assertion; and (ii) the customer asserting that it has provided the service provider with payment in an amount equal to the transaction payment amount for the business transaction (or for a performance milestone), where the service provider contradicts that assertion.

The customer may provide the customer's financial institution server 300a with the requested transaction particulars, at step S500. The customer may also provide the customer's financial institution server 300a with the user identifier userID that is uniquely associated with the customer ("customer identifier").

In response, at step S502 the customer's financial institution server 300a verifies that the current balance of the specified primary escrow account is at least equal to the escrow amount. The customer's financial institution server 300a may then establish a secondary escrow account at the customer's financial institution for the business transaction (or a plurality of secondary escrow accounts, each for a respective performance milestone), and update the balances of the respective escrow accounts to reflect a transfer of the escrow funds from the primary escrow account to the secondary escrow account(s) in amount(s) equal to the respective escrow amounts.

Alternately, instead of transferring the escrow funds from the primary escrow account to actual secondary escrow accounts, the customer's financial institution server 300a might perform a virtual funds transfer to virtual secondary escrow accounts that are associated with the primary escrow account. To track the virtual funds transfers, the customer's financial institution server 300a might insert, into the records group associated with the primary escrow account, database entries that identify the virtual secondary escrow account(s) and reflect the virtual transfer of escrow funds from the primary escrow account to the virtual escrow account(s) in amount(s) equal to the respective escrow amounts.

After the customer's financial institution 300a transfers the escrow funds from the parent escrow account to the secondary escrow account(s), the customer's financial institution server 300a populates an escrow amount data field with the escrow amount for the business transaction. If, instead, the business transaction includes a plurality of performance milestones, the escrow amount data field may be populated with the total escrow amount for the business transaction, and the escrow amounts 262 for each of the performance milestones.

After populating the escrow amount data field with the escrow amount(s) 262, the customer's financial institution server 300a generates a pointer to the primary escrow account, and a pointer to the (virtual) secondary escrow account established for the business transaction. If, instead, the business transaction includes a plurality of performance milestones, the customer's financial institution server 300a generates a pointer to the primary escrow account, and a plurality of pointers each to a respective one of the (virtual) secondary escrow accounts. The pointers identify the customer's financial institution and the financial accounts for the respective escrow accounts, and include any additional access codes that might be required for the message processing server 400 to initiate the withdrawal of the escrow funds from the (virtual) secondary escrow account(s).

At step S504, the customer's financial institution server 300a generates a token request message that includes the escrow amount data field, the pointer to the parent escrow account, the pointer(s) to the (virtual) secondary escrow account(s) and the release conditions, and transmits the token request message to the message processing server 400. The token request message may optionally also include the customer identifier userID, and the name of the service provider.

In response, the message processing server 400 generates a multi-layer token 250 from the token cryptographic keys K0, K1, the escrow amount data field, the pointer to the parent escrow account, and the pointer(s) to the (virtual) secondary escrow account(s), and optionally also the release conditions.

The message processing server 400 may also query the authorized user database 414 with the name of the service provider to determine the associated service provider userID, and include the customer identifier userID and the service provider identifier userID in the multi-layer token 250.

As discussed, the multi-layer token 250 includes a hierarchical arrangement of encrypted data segments/layers. The multi-layer token 250 may include a primary encrypted data segment/layer 252, and a first encrypted data segment/layer 254 for the business transaction. In one example, the token cryptographic keys K0, K1 are each uniquely associated with a respective one of the data segments/layers 252, 254.

Alternately, if the business transaction includes a plurality of performance milestones instead of a single performance milestone, the multi-layer token 250 may include the primary encrypted data segment/layer 252, and a plurality of first encrypted data segments/layers 254 each for respective one of the performance milestones. Further, each first encrypted data segments/layer 254 may be uniquely associated with a respective first token cryptographic key K1x of a set of first token cryptographic keys.

The first encrypted data segment/layer 254 includes the pointer to the parent escrow account, and the pointer to the (virtual) secondary escrow account for the business transaction. If, the business transaction includes a plurality of performance milestones instead of a single performance milestone, the business transaction includes a plurality of performance milestones, each first encrypted data segment/layer 254 is associated with a respective performance milestone, and includes the pointer to the parent escrow account, and the pointer to the (virtual) secondary escrow account for the performance milestone. Each first encrypted data segment/layer 254 may also include the escrow release condition(s) for the transaction/milestone, the customer identifier userID, and the service provider identifier userID.

The message processing server 400 may generate each first encrypted data segment/layer 254 by applying the associated first token cryptographic key K1/K1x, the pointer to the parent escrow account, and the pointer to the (virtual) secondary escrow account for the transaction/milestone, and optionally also the escrow release condition(s) for the transaction/milestone, the customer identifier userID, and the service provider identifier userID), as inputs to a cryptographic algorithm. If the business transaction includes a plurality of performance milestones, the message processing server 400 may also append to each first encrypted data segment/layer 254 a milestone identifier transactionID that is uniquely associated with the performance milestone.

Alternately, instead of the first encrypted data segment/layer 254 including the escrow release condition(s) for the transaction/milestone, the message processing server 400 may instead save escrow release condition(s) for the transaction/milestone in the token database 412 in association with the token identifier tokenID (and milestone identifier transactionID, as applicable).

The primary encrypted data segment/layer 252 includes the escrow amount(s) 262 for the business transaction, and each of the first encrypted data segments/layers 254. It may be advantageous to uniquely associate the multi-layer token 250 with the business transaction between the customer and the service provider. Therefore, the primary encrypted data segment/layer 252 may also include a token identifier tokenID that is uniquely associated with the business transaction. The message processing server 400 may generate the primary encrypted data segment/layer 252 by applying the master token cryptographic key K0, the escrow amount(s) 262, and the first encrypted data segment(s)/layer(s) 254 (and optionally the token identifier tokenID) as inputs to a cryptographic algorithm.

After generating the first encrypted data segment/layer 254, and the primary encrypted data segment/layer 252, the message processing server 400 saves the resulting multi-layer token 250 in the token database 412, in association with the token cryptographic keys K0, K1/K1x (and the token identifier tokenID) that were used to generate the encrypted data segment/layers 252, 254. If the business transaction includes a plurality of performance milestones, the message processing server 400 also saves, in the token database 412, for each performance milestone, the milestone identifier transactionID in association with the respective first token cryptographic key K1x that was used to generate the associated first encrypted data segment/layer 254.

The message processing server 400 may generate the token cryptographic keys K0, K1/K1x (and the token identifier tokenID and the milestone identifiers transactionID) by employing any suitable cryptographic technique known in the art, including generating each key/tokenID/transactionID from a pseudo-random number generator or a noise generator. The message processing server 400 may confirm that each new token cryptographic key K0, K1/K1x is uniquely associated with the respective data segment 252, 254 (and that each token identifier tokenID is uniquely associated with the business transaction, and each milestone identifiers transactionID is uniquely associated with a performance milestone) by querying the token database 412 with the key/tokenID/transactionID, and saving the key/tokenID/transactionID in the token database 412 only after confirming that the key/tokenID/transactionID has not already been saved to the token database 412.

The message processing server 400 may generate the token cryptographic keys K0, K1/K1$x$ (and the token identifier tokenID and the milestone identifiers transactionID) in response to the token request message received from the customer's financial institution server 300$a$ (step S502). Alternately, the token cryptographic keys K0, K1/K1$x$ (and the token identifier tokenID and the milestone identifiers transactionID) may be generated and stored in the token database 412 prior to receipt of the token request message (step S502).

At step S506, the message processing server 400 generates a token response message that includes the master token cryptographic key K0 and the token identifier tokenID, and transmits the token response message to the customer's financial institution server 300$a$. If, the business transaction includes a plurality of performance milestones instead of a single performance milestone, the token response message includes the master token cryptographic key K0, the token identifier tokenID, and the milestone identifiers transactionID for each performance milestone.

In response, the customer's financial institution server 300$a$ transmits the token response message to the customer's communications device 200$a$, at step S508. The data processing system 206 may then save the contents of the token response message in the memory 212 of the customer's communications device 200$a$.

(2) Token Decryption Phase (a) First Token Cryptographic Key Download Sub-Phase

After the customer's communications device 200$a$ receives the token response message for the prospective business transaction, the customer may propose the business transaction to the service provider by advising the service provider of the terms (e.g. particulars of the goods/services required to be delivered/performed by the service provider, particulars of any performance milestones (if any) of the business transaction, total transaction payment amount for the business transaction, transaction payment amount for each performance milestone (if any), total escrow amount proposed to guarantee payment for the business transaction, escrow amount (if any) proposed to guarantee payment for each performance milestone, and required completion date for completion of performance of the business transaction and/or the performance milestones (if any)) of the business transaction.

Before agreeing to the terms of the business transaction, the service provider might prefer that the customer first demonstrate that the payer has sufficient funds in escrow to guarantee payment for the business transaction and/or the performance milestones (if any). Given the extensive period of time typically required to receive a conventional Letter of Guarantee from a financial institution, the customer may initiate the token handling processor 216 on the customer's communications device 200$a$ and use the token handling processor 216 to request a virtual Letter of Guarantee (LOG) for the transaction. In response, the token handling processor 216 may generate a virtual Letter of Guarantee (LOG) request message that includes the token identifier tokenID, the master token cryptographic key K0 and the customer identifier userID. The token handling processor 216 may cryptographically-sign the virtual LOG request message with the customer's private cryptographic key.

At step S510, the customer's communications device 200$a$ transmits the (signed) virtual LOG request message to the service provider's communications device 200$b$. As non-limiting examples, the token handling processor 216 of the customer's communications device 200$a$ may wirelessly transmit the LOG request message to the service provider's communications device 200$b$ directly (for example via Bluetooth or NFC) or indirectly (for example via WiFi or cellular communications) by e-mail or a relay and proximity service, for example the relay service provided by Bump Technologies.

At step S512, the service provider may use the service provider's communications device 200$b$ to transmit the (signed) virtual LOG request message to the message processing server 400 for confirmation that the payer has sufficient funds in escrow to guarantee payment of the transaction payment amount(s) for the business transaction and/or the performance milestones.

Upon receipt of the virtual LOG request message, the token processor 418 of the message processing server 400 may validate the signed virtual LOG request message by confirming that the virtual LOG request message originated from the customer. The token processor 418 may query the authorized user database 414 with the customer identifier userID included in the virtual LOG request message to locate the public cryptographic key that is associated with the customer, and use the located public cryptographic key to validate the digital signature of the virtual LOG request message.

The token processor 418 may further validate the virtual LOG request message by confirming that the multi-layer token 250 is uniquely associated with the business transaction. The token processor 418 may locate the multi-layer token 250 in the token database 412 using the token identifier tokenID included in the virtual LOG request message, derive a primary decrypted data segment/layer by decrypting the primary encrypted data segment/layer 252 of the located multi-layer token 250 using the master token cryptographic key K0, read the token identifier tokenID from the primary decrypted data segment/layer, and validate the virtual LOG request message by comparing the token identifier tokenID included in the primary decrypted data segment/layer with the token identifier tokenID included in the virtual LOG request message.

If the token processor 418 successfully confirms that the multi-layer token 250 is uniquely associated with the business transaction, the token processor 418 has thereby confirmed that the customer did not attempt to demonstrate that the customer has sufficient funds in escrow to guarantee payment of the transaction payment amount for the business transaction and/or the performance milestones by providing the service provider with the multi-layer token 250 for another business transaction or the multi-layer token 250 associated with another customer of the message processing network 100.

After the token processor 418 successfully validates the (signed) virtual LOG request message, the token processor 418 extracts the escrow amount(s) 262 from the primary decrypted data segment/layer, generates an escrow sufficiency request message that includes the escrow amount(s) 262 and requests that the service provider confirm that the value of the funds actually placed in escrow for the transaction/milestone(s) matches the escrow amount(s) that the customer proposed to place into escrow to guarantee payment of the transaction payment amount. The token processor 418 transmits the escrow sufficiency request message to the service provider's communications device 200$b$, at step S514.

In response to the escrow sufficiency request message, the service provider's communications device 200$b$ extracts the escrow amount(s) from the escrow sufficiency request message, and displays on the display 202 thereof the value of the funds placed in escrow by the customer to guarantee payment for the business transaction and/or the performance milestones.

If the value of the escrow funds displayed on the display 202 matches the escrow amount(s) that the customer proposed to place into escrow to guarantee payment of the transaction payment amount(s) payable to the service provider for the transaction/milestone(s), the service provider may initiate the token handling processor 216 on the service provider's communications device 200b, and use the user input device 204 to confirm to the token handling processor 216 the sufficiency of the escrow funds. In response, the token handling processor 216 generates an escrow sufficiency acknowledgment message confirming the sufficiency of the escrow funds, and transmits the escrow sufficiency acknowledgment message to the message processing server 400, at step S516.

Upon receipt of the escrow sufficiency acknowledgment message, the token processor 418 extracts the first encrypted data segment/layer 254 from the primary decrypted data segment/layer, and saves the first encrypted data segment/layer 254 in the token database 412 in association with the tokenID, and may generate a virtual LOG response message that includes the token identifier tokenID, at step S518. The token processor 418 may also delete the associated master token cryptographic key K0 from the token database 412.

If the business transaction includes a plurality of performance milestones instead of a single performance milestones, the token processor 418 extracts all the first encrypted data segment/layers 254 from the primary decrypted data segment/layer, and saves each first encrypted data segment/layer 254 in the token database 412 in association with the tokenID and the associated milestone identifier transactionID, at step S518. In this variation, the virtual LOG response message may include the milestone identifier transactionID for each performance milestone.

The token processor 418 transmits the virtual LOG response message (if generated) to the service provider's communications device 200b, at step S520. The data processing system 206 of the service provider's communications device 200b then saves the contents of the virtual LOG response message in the memory 212 of the service provider's communications device 200b.

Steps S510 to S520 may be repeated for each multi-layer token 250. Therefore, for each virtual LOG request message, the token processor 418 decrypts the primary encrypted data segment/layer 252 of the associated multi-layer token 250 using the master token cryptographic key K0 provided by the respective service provider, and saves the first encrypted data segment/layer 254 thereof in the token database 412 in association with the tokenID (milestone identifier transactionID).

(b) Multi-Layer Token Destruction Sub-Phase

If the service provider completes performance of the business transaction (or a performance milestone thereof) by the respective completion date, the service provider may initiate the token handling processor 216 on the service provider's communications device 200b, and may use the user input device 204 thereof to report to the token handling processor 216 the completion of performance. If the service provider has received from the customer payment in the transaction payment amount for completion of performance of the business transaction (or a performance milestone thereof), the service provider may also use the user input device 204 to confirm to the token handling processor 216 the receipt of transaction payment amount.

In response, the token handling processor 216 of the service provider's communications device 200b generates a service provider performance report that includes the token identifier tokenID, and advises that the service provider has completed performance of the business transaction, and confirms that the service provider has received the transaction payment amount for the business transaction.

If the business transaction includes a plurality of performance milestones instead of a single performance milestone, the service provider performance report advises that the service provider has completed performance of a specified performance milestone, and confirms that the service provider has received the transaction payment amount payment for the performance milestone. Therefore, in this variation, the service provider performance report includes the token identifier tokenID, and the milestone identifier transactionID that is associated with the performance milestone.

The service provider may also use the input device 204 to input the service provider identifier userID to the token handling processor 216 and, therefore, the service provider performance report may also include the service provider identifier userID. The token handling processor 216 may cryptographically-sign the service provider performance report with the service provider's private cryptographic key. The token handling processor 216 transmits the (signed) service provider performance report to the message processing server 400, at step S522.

Similarly, if the service provider completes performance of the business transaction by the completion date, the customer may initiate the token handling processor 216 on the customer's communications device 200a, and use the user input device 204 thereof to confirm to the token handling processor 216 the completion of performance. If the customer has provided to the service provider payment in the transaction payment amount for completion of performance of the business transaction (or a performance milestone thereof), the service provider may also use the user input device 204 to report to the token handling processor 216 the provision of payment.

In response, the token handling processor 216 of the customer's communications device 200a generates a customer performance report that includes the token identifier tokenID, and may confirm that the service provider has completed performance of the business transaction, and/or advise that the customer has provided payment for the business transaction.

If the business transaction includes a plurality of performance milestones instead of a single performance milestone, the customer performance report may confirm that the service provider has completed performance of a specified performance milestone, and/or advise that the customer has provided payment for the performance milestone. Therefore, in this variation, the customer performance report includes the token identifier tokenID, and the milestone identifier transactionID associated with the performance milestone.

The customer may use the input device 204 to input the customer identifier userID to the token handling processor 216 and, therefore, the customer performance report message may also include the customer identifier userID. The token handling processor 216 may cryptographically-sign the customer performance report with the customer's private cryptographic key. The token handling processor 216 transmits the (signed) customer performance report to the message processing server 400, at step S524.

If the signed service provider performance report includes a service provider identifier userID, the token processor 418 may validate the service provider performance report by confirming that the service provider performance report originated from the service provider. The token processor 418 may query the authorized user database 414 with the service provider identifier userID included in the service provider performance report to locate the public cryptographic key that is associated with the service provider, and use the located public cryptographic key to validate the digital signature of the service provider performance report. If the token processor 418 cannot validate the service provider performance report, the token processor 418 may ignore the service provider performance report.

If the service provider performance report includes a service provider identifier userID, the token processor 418 may further validate the service provider performance report by confirming that the message processing server 400 is authorized to consider a service provider performance report from the service provider for the multi-layer token 250 (i.e. the service provider is authorized to request a transfer/release of the escrow funds from the secondary escrow account). The token processor 418 may derive a first decrypted data segment/layer by extracting the token identifier tokenID from the service provider performance report, locating the first encrypted data segment/layer 254 and the first token cryptographic key K1 that are associated with the token identifier tokenID in the token database 412, and decrypting the located first encrypted data segment/layer 254 with the first token cryptographic key K1. The token processor 418 may then validate the service provider performance report by comparing the service provider identifier userID included in the first decrypted data segment/layer with the service provider identifier userID included in the service provider performance report.

Similarly, if the service provider performance report includes a milestone identifier transactionID, the token processor 418 may derive the first decrypted data layer by locating the first encrypted data segment/layer 254 and the first token cryptographic key K1$x$ that are associated with the milestone identifier transactionID in the token database 412, and decrypting the located first encrypted data segment/layer 254 with the first token cryptographic key K1$x$. The token processor 418 may then validate the service provider performance report by comparing the service provider identifier userID included in the first decrypted data segment/layer for the performance milestone with the service provider identifier userID included in the service provider performance report.

If the customer performance report includes a customer identifier userID, the token processor 418 may validate the customer performance report by confirming that the customer performance report originated from the customer. The token processor 418 may query the authorized user database 414 with the customer identifier userID included in the customer performance report to locate the public cryptographic key that is associated with the customer, and use the located public cryptographic key to validate the digital signature of the customer performance report. If the token processor 418 cannot validate the customer performance report, the token processor 418 may ignore the customer performance report.

If the customer performance report includes a customer identifier userID, the token processor 418 may further validate the customer performance report by confirming that the message processing server 400 is authorized to consider a customer performance report from the customer for the multi-layer token 250 (i.e. the customer is authorized to request a transfer/release of the escrow funds from the secondary escrow account). The token processor 418 may validate the service provider performance report by comparing the customer identifier userID included in the first decrypted data segment/layer with the customer identifier userID included in the customer performance report. Similarly, if the customer performance report includes a milestone identifier transactionID, the token processor 418 may derive the first decrypted data layer by comparing the customer identifier userID included in the first decrypted data segment/layer for the performance milestone with the customer identifier userID included in the customer performance report.

After receiving and validating the (signed) service provider performance report and/or the (signed) customer performance report, the token processor 418 may use the pointers to the primary and secondary escrow accounts to effect a transfer of escrow funds for the transaction/milestone from the secondary escrow account to the primary escrow account.

At step S526, the token processor 418 may extract from the first decrypted data segment/layer the pointer to the secondary escrow account that holds the escrow funds, and may also extract from the first decrypted data segment/layer the pointer to the primary escrow account into which the escrow funds should be transferred. As discussed, the pointer to the secondary escrow account includes any access codes that might be required for the message processing server 400 to initiate the release of the escrow funds from the (virtual) secondary escrow account(s) from the secondary escrow account(s) in an amount equal to the escrow amount for the transaction/milestone.

At step S528, the message processing server 400 may generate a transfer escrow command that includes the pointers to the respective escrow accounts, and transmit the transfer escrow command to the customer's financial institution server 300$a$.

Alternately, instead of effecting the transfer/release of escrow funds for the transaction/milestone from the secondary escrow account to the primary escrow account upon receipt of the (signed) service provider performance report and/or the (signed) customer performance report, the token processor 418 may correlate the service provider performance report and the customer performance report with the primary release condition(s) to determine whether the escrow funds for the transaction/milestone should be transferred from the secondary escrow account for the transaction/milestone to the primary escrow account. As discussed, the primary release conditions may require that the token processor 418 should initiate a transfer of the escrow funds from the secondary escrow account when one or more of the primary release conditions (alternately or cumulatively) are satisfied.

For example, the primary release conditions might require that the token processor 418 should initiate a transfer of the escrow funds from the secondary escrow account when all of the following conditions are satisfied:

(i) the customer alleges that it has provided the service provider with payment in an amount equal to the transaction payment amount for the business transaction (or for a performance milestone); and (ii) the service provider alleges that it has completed performance of the business transaction (or performance milestone) by the completion date (e.g. the service provider shipped the goods ordered by the customer, or performed the services requested by the customer).

In this example, the token processor 418 would not initiate a transfer of the escrow funds from the secondary escrow account unless the following conditions were met:

(a) the service provider performance report indicates that the service provider alleges that it has completed performance of the business transaction (or the performance milestone) by the completion date; and (b) the customer performance report indicates that the customer alleges that it has provided payment to the service provider in the transaction payment amount for completion of performance of the business transaction (or the performance milestone).

As another example, the primary release conditions might require that the token processor 418 should initiate a transfer of the escrow funds from the secondary escrow account when either of the following conditions are satisfied:

(i) the customer confirms that the service provider completed performance of the business transaction (or performance milestone) by the completion date (e.g. the customer received the goods ordered by the customer, or received the services requested by the customer); or (ii) the service provider confirms that it has received payment from the customer in an amount equal to the transaction payment amount for the business transaction (or performance milestone).

In this latter example, the token processor 418 would not initiate a transfer of the escrow funds from the secondary escrow account if either of the following conditions were met:

(a) the customer performance report indicates that the customer confirms that the service provider completed performance of the business transaction (or the performance milestone) by the completion date; or (b) the service provider performance report indicates that the service provider confirms that it received payment from the customer in the transaction payment amount for completion of performance of the business transaction (or the performance milestone).

In this variation, at step S526 the token processor 418 may extract the primary release condition(s) for the transaction/milestone from the first decrypted data segment/layer. Alternately, if the primary release condition(s) for the transaction/milestone were stored in the token database 412 (instead of the first decrypted data segment/layer), at step S526 the token processor 418 may locate the primary release condition(s) that are associated with the token identifier tokenID (milestone identifier transactionID) in the token database 412.

If the token processor 418 determines from the primary release condition(s) and the service provider and/or customer performance reports (as applicable) that the escrow funds for the transaction/milestone should be transferred from the secondary escrow account to the primary escrow account, the token processor 418 uses the pointers to the primary and secondary escrow accounts to effect a transfer of escrow funds, in the escrow amount, from the secondary escrow account to the primary escrow account.

At step S528, the message processing server 400 generates a transfer escrow command that includes the pointers to the respective escrow accounts, and transmits the transfer escrow command to the customer's financial institution server 300a.

Independently of whether the token processor 418 generates the transfer escrow command after receiving the (signed) service provider performance report and/or the (signed) customer performance report, or after correlating the service provider and/or customer performance reports with the release condition(s), in response the customer's financial institution server 300a determines the primary escrow account and the (virtual) secondary escrow account from the pointers included in the transfer escrow command.

The customer's financial institution server 300a then transfers the funds, in the escrow amount, from the determined secondary escrow account to the determined primary escrow account, by adding to the determined primary escrow account at least one database record that identifies a deposit of the escrow amount to the primary escrow account. The customer's financial institution server 300a also closes the determined secondary escrow account or otherwise excises the transaction payment amount from the secondary escrow account, for example by adding to the determined secondary escrow account at least one database record that identifies a withdrawal of the escrow amount from the secondary escrow account.

As discussed, where the escrow funds are stored in a virtual secondary escrow account, the escrow amount is noted in a records group that is associated with the primary escrow account. Therefore, in this variation, the escrow funds need not be "transferred" into the primary escrow account. Instead, the escrow funds can be "released" by deleting the records group that noted the transfer of the escrow amount to the virtual secondary escrow account. Accordingly, in this variation, the transfer escrow command, transmitted at step S528, need not include a pointer to an actual secondary escrow account, but may instead include a pointer to the records group that notes the escrow amount. As a result, the customer's financial institution server 300a may release the funds, in the escrow amount, from the determined secondary escrow account, for example by deleting the records group that noted the transfer of the escrow amount to the virtual secondary escrow account.

At step S530, the customer's financial institution server 300a may respond to the transfer escrow command by transmitting to the message processing server 400 a transfer escrow acknowledgment message that confirms the return of the escrow funds to the primary escrow account. In response, the message processing server 400 purges the remnants of multi-layer token 250 from the token database 214 by deleting from the token database 214 the token identifier tokenID, the first decrypted data segment/layer and the associated first token cryptographic key K1 (and business rule(s)) for the business transaction. The message processing server 400 may transmit the transfer escrow acknowledgment message to the customer's communications device 200a, in response to the customer performance report, at step S532.

If the business transaction includes a plurality of performance milestones instead of a single performance milestone, the message processing server 400 removes from the token database 214 the milestone identifier transactionID, the first decrypted data segment/layer and the associated first token cryptographic key K1$x$ (and business rule(s)) for the performance milestone. Steps S522 to S532 may be repeated for each remaining performance milestone, whereupon the message processing server 400 removes the token identifier tokenID from the token database 214 upon completion of the last remaining performance milestone.

If the service provider and/or customer performance reports (as applicable) are insufficient for the token processor 418 to transfer the escrow funds from the secondary escrow account based on the primary release condition(s), the token processor 418 may correlate the service provider performance report and the customer performance report with the secondary release condition(s) to determine whether the escrow funds for the transaction/milestone can nevertheless be transferred from the secondary escrow account.

If the token processor 418 determines from the secondary release condition(s) and the service provider and/or customer performance reports (as applicable) that the escrow funds can be transferred from the secondary escrow account), the token processor 418 may initiate the funds transfer to the primary escrow account or to a payee account associated with the service provider, in accordance with the foregoing steps, upon receipt of a third-party direction for the funds transfer (for example, upon receipt of a direction from a mediator, administrative body or court of competent jurisdiction).

Steps S522 to S532 may be performed concurrently with steps S500 to S520. Therefore, for each set of performance reports received from a customer and/or a service provider in regards to a multi-layer token 250, the customer's financial institution server 300a returns, to the primary escrow account, escrow funds from the (virtual) secondary escrow account in an amount equal to the escrow amount specified in the multi-layer token 250. The customer may also concurrently direct the message processing server 400 to generate new multi-layer tokens 250 for each new business transaction, whether for the same service provider (for the same escrow amount or a different escrow amount) or for different service providers. Therefore, for each new business transaction, the customer's financial institution server 300a verifies that the current balance of the primary escrow account (after a return of escrow funds from one of the (virtual) secondary escrow accounts, if any) is at least equal to the escrow amount for the new business transaction, and generates a new multi-layer token 250 (and the associated cryptographic keys K0, K1/K1x and token identifier tokenID) for the business transaction and transmits the master token cryptographic key K0 and the token identifier tokenID to the customer's financial institution server 300a.

The invention claimed is:

1. A message processing server comprising:
    a memory storing a token database of multi-layer tokens, each said multi-layer token including a plurality of encrypted data layers, a primary one of the encrypted data layers including a first of the encrypted data layers, the first of the encrypted data layers including a database pointer and at least one rule;
    a network interface; and
    a message processor coupled to the memory and the network interface and configured to:
        receive from a communication device, via the network interface, a virtual letter of guarantee request message including a token identifier;
        retrieve one of the multi-layer tokens from the token database based on the token identifier;
        derive a primary decrypted data layer from the one multi-layer token by decrypting the primary encrypted data layer of the one multilayer token using a master cryptographic key;
        validate the virtual letter of guarantee request message by determining that an identifier in the primary decrypted data layer matches the token identifier;
        extract a predetermined data value from the primary decrypted data layer;
        provide the communications device, via the network interface, with the predetermined data value;
        receive an acknowledgement message from the communications device, via the network interface, in response to the predetermined data value;
        based on the acknowledgement message, extract the first of the encrypted data layers from the primary decrypted data layer;
        save the first of the encrypted data layers in the token database;
        receive, via the network interface, at least one authorization message, the authorization message identifying the one multi-layer token and including performance data;
        derive a first decrypted data layer from the first of the encrypted data layers of the one multi-layer token;
        extract the database pointer and the at least one rule from the first decrypted data layer;
        confirm that the performance data is consistent with the at least one rule;
        determine a secondary database via the database pointer; and
        excise the predetermined data value from the secondary database by (i) adding to the secondary database at least one new database record reflecting a withdrawal of funds from the secondary database in an amount of the predetermined data value, and (ii) adding to a primary database at least one new database record reflecting a deposit of funds to the primary database in an amount of the predetermined data value.

2. The message processing server according to claim 1, wherein the message processor is configured to:
    locate a first cryptographic key associated with the one multi-layer token in the token database, in response to the receiving at least one authorization message; and
    derive the first decrypted data layer by decrypting the first of the encrypted data layers with the located first cryptographic key.

3. A method of excising data, the method being executable on a computer having a network interface and a memory, the method comprising the computer:
    storing in the memory a token database of multi-layer tokens, each said multi-layer token including a plurality of encrypted data layers, a primary one of the encrypted data layers including a first of the encrypted data layers, the first of the encrypted data layers including a database pointer and at least one rule;
    receiving from a communication device, via the network interface, a virtual letter of guarantee request message including a token identifier;
    retrieving one of the multi-layer tokens from the token database based on the token identifier;
    deriving a primary decrypted data layer from the one multi-layer token by decrypting the primary encrypted data layer of the one multilayer token using a master cryptographic key;
    validating the virtual letter of guarantee request message by determining that an identifier in the primary decrypted data layer matches the token identifier;
    extracting a predetermined data value from the primary decrypted data layer;
    providing the communications device, via the network interface, with the predetermined data value;
    receiving an acknowledgement message from the communications device, via the network interface, in response to the predetermined data value;
    based on the acknowledgement message, extracting the first of the encrypted data layers from the primary decrypted data layer;
    saving the first of the encrypted data layers in the token database;

receiving, via the network interface, at least one authorization message, the authorization message identifying the one multi-layer token and including performance data;

deriving a first decrypted data layer from the first of the encrypted data layers of the one multi-layer token;

extracting the database pointer and the at least one rule from the first decrypted data layer;

confirming that the performance data is consistent with the at least one rule;

determining a secondary database via the database pointer; and excising the predetermined data value from the secondary database by (i) adding to the secondary database at least one new database record reflecting a withdrawal of funds from the secondary database in an amount of the predetermined data value, and (ii) adding to a primary database at least one new database record reflecting a deposit of funds to the primary database in an amount of the predetermined data value.

4. The method according to claim 3, wherein the deriving a first decrypted data layer comprises the computer:

locating a first cryptographic key associated with one multi-layer token in the token database, in response to the receiving at least one authorization message; and decrypting the first of the encrypted data layers with the located first cryptographic key.

5. A tangible non-transient computer-readable medium storing computer processing instructions which, when executed by a computer, cause the computer to:

store in a memory a token database of multi-layer tokens, each said multi-layer token including a plurality of encrypted data layers, a primary one of the encrypted data layers including a first of the encrypted data layers, the first of the encrypted data layers including a database pointer and at least one rule;

receive from a communication device, via the network interface, a virtual letter of guarantee request message including a token identifier;

retrieve one of the multi-layer tokens from the token database based on the token identifier;

derive a primary decrypted data layer from the one multi-layer token by decrypting the primary encrypted data layer of the one multilayer token using a master cryptographic key;

validate the virtual letter of guarantee request message by determining that an identifier in the primary decrypted data layer matches the token identifier;

extract a predetermined data value from the primary decrypted data layer;

provide the communications device, via the network interface, with the predetermined data value;

receive an acknowledgement message from the communications device, via the network interface, in response to the predetermined data value;

based on the acknowledgement message, extract the first of the encrypted data layers from the primary decrypted data layer;

save the first of the encrypted data layers in the token database;

receive at least one authorization message identifying the one multi-layer token and including performance data;

derive a first decrypted data layer from the first of the encrypted data layers of the multi-layer token;

extract the database pointer and the at least one rule from the first decrypted data layer;

confirm that the performance data is consistent with the at least one rule;

determine a secondary database via the database pointer; and excise the predetermined data value from the secondary database by (i) adding to the secondary database at least one new database record reflecting a withdrawal of funds from the secondary database in an amount of the predetermined data value, and (ii) adding to a primary database at least one new database record reflecting a deposit of funds to the primary database in an amount of the predetermined data value.

6. The computer-readable medium according to claim 5, wherein the processing instructions cause the computer to derive the first decrypted data layer by:

in response to the receiving at least one authorization message, locating in the token database a first cryptographic key associated with the one multi-layer token in the token database; and decrypting the first of the encrypted data layers with the located first cryptographic key.

7. The message processing server according to claim 1, wherein the virtual letter of guarantee request message includes a customer identifier and a digital signature of a customer, and the message processor is further configured to, prior to retrieving the one multi-layer token from the token database:

retrieve a public key of the customer from an authorized user database based on the customer identifier; and verify the digital signature of the customer using the public key.

8. The method according to claim 3, wherein the virtual letter of guarantee request message includes a customer identifier and a digital signature of a customer, and the method further comprises, prior to retrieving the one multi-layer token from the token database:

retrieving a public key of the customer from an authorized user database based on the customer identifier; and verifying the digital signature of the customer using the public key.

9. The computer-readable medium according to claim 5, wherein the virtual letter of guarantee request message includes a customer identifier and a digital signature of a customer, and the processing instructions cause the computer to, prior to retrieving the one multi-layer token from the token database:

retrieve a public key of the customer from an authorized user database based on the customer identifier; and verify the digital signature of the customer using the public key.

* * * * *